G. I. LEONARD.
ENGINE.
APPLICATION FILED DEC. 15, 1917.
1,279,373.
Patented Sept. 17, 1918.
2 SHEETS—SHEET 1.
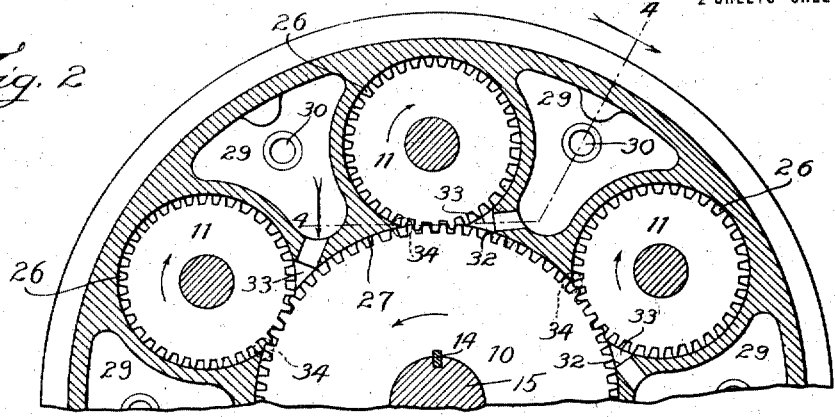
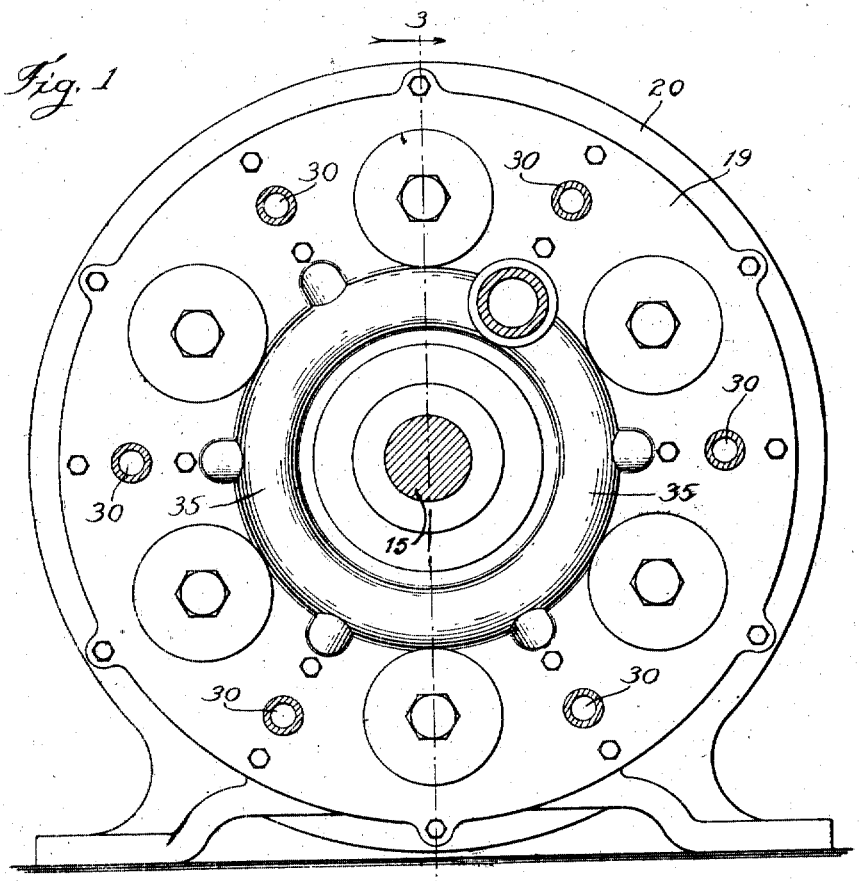
Witnesses:
Marvin S. Kahl
Irwin C. Bowman
Inventor:
George I. Leonard,
By Dyrenforth, Lee, Chritton and Wiles
Attys

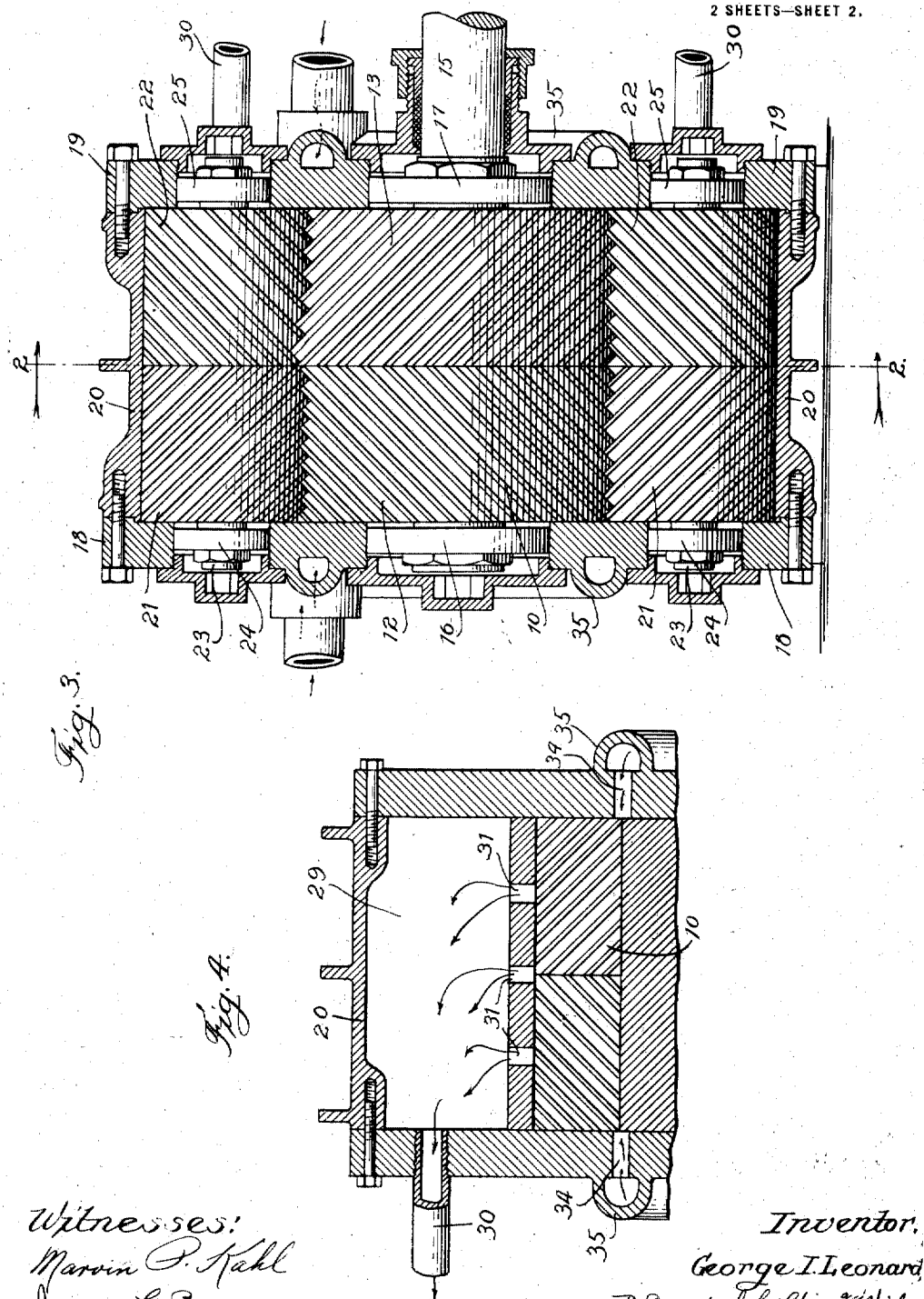

UNITED STATES PATENT OFFICE.

GEORGE I. LEONARD, OF CHICAGO, ILLINOIS, ASSIGNOR TO LEONARD VALVELESS ENGINE COMPANY, A CORPORATION OF MAINE.

ENGINE.

1,279,373.

Specification of Letters Patent.

Patented Sept. 17, 1918.

Application filed December 15, 1917. Serial No. 207,277.

*To all whom it may concern:*

Be it known that I, GEORGE I. LEONARD, a citizen of the United States, residing at Chicago, in the county of Cook and State of Illinois, have invented a new and useful Improvement in Engines, of which the following is a specification.

My invention relates more particularly to engines of the type employing intermeshing gears driven by the introduction of a fluid, such as steam, into the intermeshing portions of the gears; and my objects, generally stated, are to provide improvements in engines of this general type to the end that greater power may be obtained from the engine, the wear of parts reduced to the minimum, and smoother running obtained.

Referring to the accompanying drawings—

Figure 1 is a view in end elevation, of an engine constructed in accordance with my invention. Fig. 2 is a sectional view of the upper part of the engine, the section being taken at the line 2—2 on Fig. 3 and viewed in the direction of the arrows. Fig. 3 is a section taken at the line 3 on Fig. 1 and viewed in the direction of the arrow; and Fig. 4, a broken section taken at the line 4 on Fig. 2 and viewed in the direction of the arrow.

According to the illustrated, preferred embodiment of my invention, I employ a central gear 10 and a plurality of intermeshing gears 11, of relatively small diameter, grouped about the periphery of the gear 10, preferably at equal intervals, and provide for the introduction of the driving fluid, such as steam, into the intermeshing portions of all the gears. The gear 10 which is preferably formed of two sections 12 and 13 forming a gear of the herringbone variety, as shown in Fig. 2, is rigidly secured, as by a key 14 to a shaft 15 constituting the drive shaft of the engine and journaled at its opposite ends in ball bearings 16 and 17 located in openings in plates 18 and 19 respectively, disposed at opposite sides of the gear 10 and rigidly secured in flatwise condition against the ends of a circular hollow member 20 which forms with the plates 18 and 19, a casing for the gears. The gears 11 are also provided in sections represented at 21 and 22, these sections being so constructed and arranged, as shown, as to present gears of the herringbone type intermeshing with the teeth of the gear 10. The gears 11 are secured to the shafts 23 journaled in ball-bearings 24 and 25 in the plates 18 and 19, respectively. The ring-shaped member 20 contains circumferential series of circular openings 26 in which the gears 11 have journal fit and an opening 27 in which the gear 10 has journal fit. The member 20 also contains a series of openings 29 extending transversely thereof and alternating with the openings 26, these openings extending entirely through the member 20, as represented more particularly in Fig. 4. These openings, which form exhaust-passages, communicate respectively with pipes 30 opening through the plate 19. In this construction, the exhaust is through the face of the gears and by preference a plurality of exhaust-passages 31 are provided for each passage 29, the passages 31 being located in the portions of the member 20 which extend into the spaces between the adjacent gears, the forward tapering portions thereof, and which are represented at 32, being cut away along the entire length of the gears, as represented at 33, to provide spaces in communication with the exhaust-passages 31, to insure exhausting without back-pressure.

The inlet ports of the engine through which the driving fluid is supplied to the intermeshing gears, are located at the side of the center line of the gears opposite that at which the exhaust-passages are located, these inlets being disposed at opposite ends of the gears, as represented at 34, closely adjacent to the point at which the gears intermesh. On each plate 18 and 19 is a hollow ring-portion 35 for communication with a source of suitable driving fluid and into which the ports 34 open as represented.

In this construction, the vertices of the angles of the teeth of the gears at the center of the latter extend in a direction away from the driving fluid entering the casing through the inlets 34.

The operation of the engine is as follows:

The driving fluid enters the channels 35 and is distributed to the various inlet-ports 34 from whence it discharges into the ends of the spaces or pockets in the gears, with the result of rotating the gears 11 and the gear 10 in the directions of the respective arrows. As the pockets or spaces between the gears move into registration with the ports 31, the spent fluid pressure exhausts therethrough and passes out through the passages 29 and pipes 30, as represented by the arrows in Figs. 3 and 4.

While I have illustrated and described a particular embodiment of my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. An engine comprising, in combination, intermeshing herring-bone gears, a casing for said gears closely fitting the latter except at a relatively small area immediately in advance of the point at which the gears intermesh, said casing being formed with side plates which closely fit said gears and carrying bearings for the shafts of said gears, said plates containing inlet ports for simultaneously admitting fluid under pressure at the outer ends of the teeth of said gears, and an exhaust-port registering with said area.

2. An engine comprising, in combination, intermeshing herring-bone gears, a casing for said gears, inlets at opposite ends of the gears with which the ends of the grooves between the teeth of the gears are caused to successively register in the rotation of the gears, and an exhaust-port for said gears.

3. An engine comprising, in combination, intermeshing herring-bone gears, a casing for said gears, inlets at opposite ends of the gears with which the ends of the grooves between the teeth of the gears are caused to successively register in the rotation of the gears; and an exhaust-port for said gears, the vertices of the angles of the teeth of the gears at the center of the latter extending in a direction away from the fluid admitted into the casing.

GEORGE I. LEONARD.